G. GUNTHER.
Bird-Cage.

No. 162,645. Patented April 27, 1875.

Witnesses:
Emyl Bilhuber
Chas. Wahlers

Inventor
Gottlob Günther
Van Santvoord & Hauff
Attys

UNITED STATES PATENT OFFICE.

GOTTLOB GÜNTHER, OF NEW YORK, N. Y.

IMPROVEMENT IN BIRD-CAGES.

Specification forming part of Letters Patent No. 162,645, dated April 27, 1875; application filed February 24, 1875.

*To all whom it may concern:*

Figure 1:
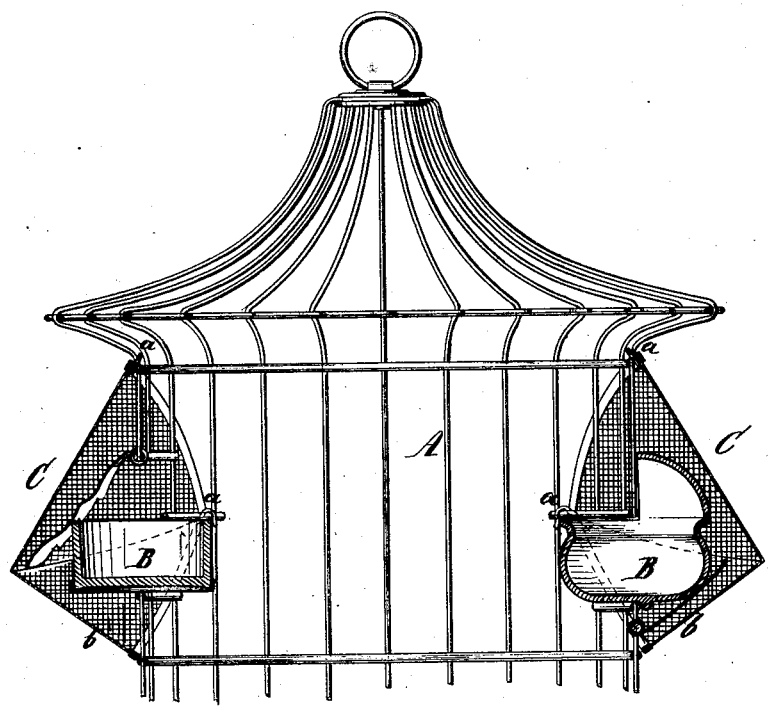
Figure 2:
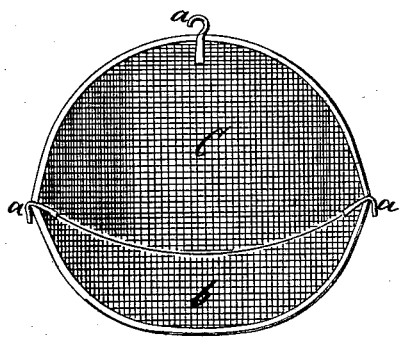

Be it known that I, GOTTLOB GÜNTHER, of the city, county, and State of New York, have invented a certain new and useful Improvement in Bird and Animal Cages, of which the following is a specification:

This invention is illustrated in the accompanying drawing, in which Figure 1 represents a vertical central section. Fig. 2 is a detached inside view of one of the screens.

Similar letters indicate corresponding parts.

My invention consists in a screen made of perforated sheet metal, or of any other suitable transparent or semi-transparent material, and provided with suitable fastenings for attaching the same to a bird or animal cage, said screen being made with an inclined bottom, and of such a shape that the same can be attached to a cage over the feed and drinking cups, and that by said screens when they are in position, the spilling of water or scattering of feed beyond or outside of cage will be prevented.

In the drawing, the letter A designates a bird or animal cage, to which are secured the feed and drinking cups B in any desirable manner, so that the same can be conveniently moved and inserted from the outside. With this cage and its feed and water cups I combine two screens, C C, each of which is provided with hooks or other suitable fastenings $a$, so that the same can be conveniently attached to the cage when the cups B are in their position, or that said screens can be readily removed in order to get access to the cups B. The screens C are made of perforated sheet metal, or of any suitable transparent or semi-transparent material, and their bottom parts $b$ are inclined, so that any feed which may be spilled by the bird or animal from the feed-cup will drop down on the bottom of the cage, and the bird or animal inclosed in the cage will be prevented from spilling any feed or water beyond the cage while drinking or eating from the cups.

The hooks or fastenings $a$ may be so arranged that they catch over the cross-bands of the cage, as shown in the drawing, or they may be arranged in any suitable manner, so that the screens can be readily removed or put in position, as may be desirable; and it will be readily seen that by these screens the scattering of the seed outside of the cage is materially prevented.

What I claim as new, and desire to secure by Letters Patent, is—

The combination, with a bird-cage having removable feed cup or cups B arranged in its sides, as described, of the removable screens C, having an inclined bottom, $b$, and arranged over the feed-cups, as and for the purpose described.

In testimony that I claim the foregoing I have hereunto set my hand and seal.

G. GÜNTHER. [L. S.]

Witnesses:
 W. HAUFF,
 E. F. KASTENHUBER.